(12) United States Patent
Qiu et al.

(10) Patent No.: US 12,002,241 B2
(45) Date of Patent: Jun. 4, 2024

(54) FULL-AUTOMATIC CALIBRATION METHOD AND APPARATUS ORIENTED TO STRUCTURED LIGHT 3D VISION SYSTEM

(71) Applicant: Wuyi University, Jiangmen (CN)

(72) Inventors: Tian Qiu, Jiangmen (CN); Xin Zhang, Jiangmen (CN); Peiwen Wu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 253 days.

(21) Appl. No.: 17/622,604

(22) PCT Filed: Dec. 27, 2019

(86) PCT No.: PCT/CN2019/128962
§ 371 (c)(1),
(2) Date: Dec. 23, 2021

(87) PCT Pub. No.: WO2021/096111
PCT Pub. Date: May 20, 2021

(65) Prior Publication Data
US 2022/0358680 A1 Nov. 10, 2022

(30) Foreign Application Priority Data
Nov. 15, 2019 (CN) .......................... 201911116903.5

(51) Int. Cl.
*G06T 7/80* (2017.01)

(52) U.S. Cl.
CPC ...................................... *G06T 7/85* (2017.01)

(58) Field of Classification Search
CPC ............. G06T 7/85; G06T 2207/10152; G06T 2207/30204
See application file for complete search history.

(56) References Cited

U.S. PATENT DOCUMENTS

| | | | |
|---|---|---|---|
| 10,366,531 B2* | 7/2019 | Sheffield | G06T 15/04 |
| 10,373,336 B1* | 8/2019 | Islam | B25J 9/1697 |
| 10,565,737 B1* | 2/2020 | Islam | H04N 17/002 |
| 2004/0202364 A1* | 10/2004 | Otani | H04N 13/246 |
| | | | 348/E13.016 |
| 2018/0194008 A1* | 7/2018 | Namiki | G06T 7/80 |
| 2019/0122425 A1* | 4/2019 | Sheffield | H04N 13/243 |

FOREIGN PATENT DOCUMENTS

| | | |
|---|---|---|
| CN | 101814185 A | 8/2010 |
| CN | 106017312 A | 10/2016 |
| CN | 106441099 A | 2/2017 |
| CN | 108709499 A | 10/2018 |
| CN | 110111394 A | 8/2019 |
| KR | 20190050819 A | 5/2019 |

* cited by examiner

*Primary Examiner* — Boubacar Abdou Tchoussou
(74) *Attorney, Agent, or Firm* — Vivacqua Crane, PLLC

(57) ABSTRACT

A full-automatic calibration method and apparatus oriented to a structured light 3D vision system are disclosed. For an erected 3D vision system, full-automatic calibration can be completed without moving the 3D vision system; and for an unfixed 3D vision system, full-automatic calibration can be completed without manual operation. By using the full-automatic calibration method oriented to the structured light 3D vision system, on one hand, non-professionals can easily complete calibration of structured light 3D imaging; and on the other hand, a problem of calibrating a large number of 3D cameras can also be solved.

6 Claims, 4 Drawing Sheets

FULL-AUTOMATIC CALIBRATION METHOD AND APPARATUS ORIENTED TO STRUCTURED LIGHT 3D VISION SYSTEM

CROSS-REFERENCE TO RELATED APPLICATIONS

This application is a national stage filing under 35 U.S.C. § 371 of international application number PCT/CN2019/128962, filed Dec. 27, 2019, which claims priority to Chinese patent application No. 2019111169035 filed Nov. 15, 2019. The contents of these applications are incorporated herein by reference in their entirety.

TECHNICAL FIELD

The disclosure relates to the technical field of visual identification, and more particularly, to a full-automatic calibration method and apparatus oriented to a structured light 3D vision system.

BACKGROUND

At present, the upgrading of a mobile optical device (such as a camera mounted on a mobile phone) has been stagnated at a two-dimensional level such as pixel and light sensitivity, which is also a main driving force of an innovation period of a smart phone. A 3D imaging system implements the superposition of pixel and field depth based on the two-dimensional level, and records stereoscopic information of an object while taking a picture of the object. The 3D imaging system will promote the realization of face identification and remote gesture control in the future, and will be an innovation focus of an imaging device in the future.

In terms of three-dimensional imaging, stereoscopic imaging based on structured light has always occupied an important position, with the advantages of a high speed and a high precision. The structured light is a light field with a special organization structure, such as a light spot, stripe light, and encoded structured light. A two-dimensional structured light image is projected onto a measured object, and depth information of a surface of the measured object may be calculated by a trigonometric function according to a distortion degree of the image. According to this principle, a series of 3D imaging systems based on the structured light are generated.

The 3D imaging system based on the structured light needs a projection system and a capturing system, and the two systems are located in different 3D coordinate systems. If the 3D coordinate systems need to be operated together, a complicated calibration process is needed.

The calibration process of the 3D vision system is complicated. Since a total number of the 3D vision systems is not large at present, the calibration of the 3D vision systems is mainly performed manually in a laboratory or a factory. The calibration includes a series of manual photographing and program operation processes. Even professionals in an optical or imaging field need precise operation according to an operating instruction to complete the calibration process once.

With the wide application of the 3D vision system, for example, it is said that every mobile phone in the future may be equipped with one 3D vision system, it means that the shipment of the 3D vision systems will be increased or even sharply increased. However, manual calibration is generally performed in a laboratory and a workshop so far. The batch calibration of 3D cameras cannot be completed by the current method.

The 3D imaging system based on the structured light not only needs to be calibrated before leaving the factory, but also needs to be recalibrated when being subjected to collision, vibration or a large external force. It is not easy to complete the calibration process precisely even for ordinary maintenance technicians.

SUMMARY

In order to solve the above problem, the disclosure aims to provide a full-automatic calibration method and apparatus oriented to a structured light 3D vision system. The calibration method is convenient to operate, so that non-professionals can also easily complete calibration of structured light 3D imaging by the calibration method. For manufacturers and users of 3D cameras, the 3D vision system may also be calibrated in batch by the calibration method.

The technical solutions used in the disclosure to solve the problem are as follows.

In a first aspect, an embodiment of the disclosure provides a full-automatic calibration method oriented to a structured light 3D vision system, which includes the following steps of:

erecting a 3D vision system and a manipulator;
mounting a calibration target and a controllable lighting system on the manipulator;
initializing a position of the manipulator; and
running an automatic calibration system, and outputting calibration results.

Further, the running an automatic calibration system includes the following steps of:

1) taking 20 sets of pictures, with 45 pictures in each set;
2) inputting the 20 sets of pictures into a calibration algorithm of Zhang Zhengyou, and detecting results;
3) adding one set of recorded results;
4) if a number of sets of "recorded results" is less than 2, returning to step 1); otherwise, going to step 5);
5) if the number of sets of "recorded results" is equal to 2, going to step 6);
6) if a result difference is less than a set threshold, going to step 7); otherwise, returning to step 1); and
7) averaging, and outputting results.

Further, the taking 20 sets of pictures includes the following steps of:

1) starting single-picture taking;
2) if a picture is obtained, continuing next step; and if no picture is obtained, searching for a picture;
3) performing hexagonal shift in a Z plane, taking a picture at each position, and judging a number of angular points and sorting the angular points;
4) if no picture is obtained, expanding a search range;
5) if no picture is obtained yet, returning to an original point, adjusting a direction of the Z plane by 45 degrees, and repeating the operations;
6) if a position of a largest angular point is found, adjusting a direction and a brightness of the 3D vision system to obtain a first complete front picture, and recording the position;
7) adjusting an angle to obtain a set of pictures;
8) adjusting a distance to obtain a set of pictures; and
9) obtaining 20 sets of pictures in total, with 50 pictures in each set.

Further, the running an automatic calibration system is performed for calibration for twice or three times.

In a second aspect, an embodiment of the disclosure further provides a full-automatic calibration apparatus oriented to a structured light 3D vision system, which includes:

an erecting module, configured for erecting a 3D vision system and a manipulator;

a mounting module, configured for mounting a calibration target and a controllable lighting system on the manipulator;

an initializing module, configured for initializing a position of the manipulator; and a calibrating module, configured for running an automatic calibration system, and outputting calibration results.

In a third aspect, an embodiment of the disclosure further provides a full-automatic calibration device oriented to a structured light 3D vision system, which includes:

at least one processor; and a memory in communication with the at least one processor; wherein, the memory is configured to store an instruction executable by the at least one processor, and the instruction, when executed by the at least one processor, causes the at least one processor i to perform the method in the first aspect of the disclosure.

On a fourth aspect, an embodiment of the disclosure further provides a computer-readable storage medium, wherein the computer-readable storage medium stores a computer-executable instruction, and the computer-executable instruction is configured for enabling a computer to perform the method in the first aspect of the disclosure.

One or more technical solutions provided in the embodiments of the disclosure at least have the following beneficial effects: the disclosure provides the full-automatic calibration method and apparatus oriented to the structured light 3D vision system. For the erected 3D vision system, full-automatic calibration can be completed without moving the 3D vision system; and for an unfixed 3D vision system, full-automatic calibration can be completed without manual operation. By using the calibration method, on one hand, non-professionals can easily complete calibration of structured light 3D imaging; and on the other hand, a problem of calibrating a large number of 3D cameras can also be solved.

BRIEF DESCRIPTION OF THE DRAWINGS

The disclosure is further described hereinafter with reference to the accompanying drawings and the embodiments.

DETAILED DESCRIPTION

To make the objectives, the technical solutions, and the advantages of the disclosure clearer, the disclosure is further described in detail hereinafter with reference to the accompanying drawings and the embodiments. It should be understood that the specific embodiments described herein are only used for explaining the disclosure and are not intended to limit the disclosure.

It should be noted that, the various features in the embodiments of the disclosure may be combined with each other to derive other embodiments not explicitly described in the disclosure, and all such embodiments are included in the scope of protection of the disclosure. In addition, although the functional modules are divided in the apparatus diagram and the logical sequence is shown in the flow chart, the steps shown or described may be performed according to different module division in the apparatus or different sequence in the flow chart in some cases.

The embodiments of the disclosure are further described hereinafter with reference to the accompanying drawings.

Figure 1:
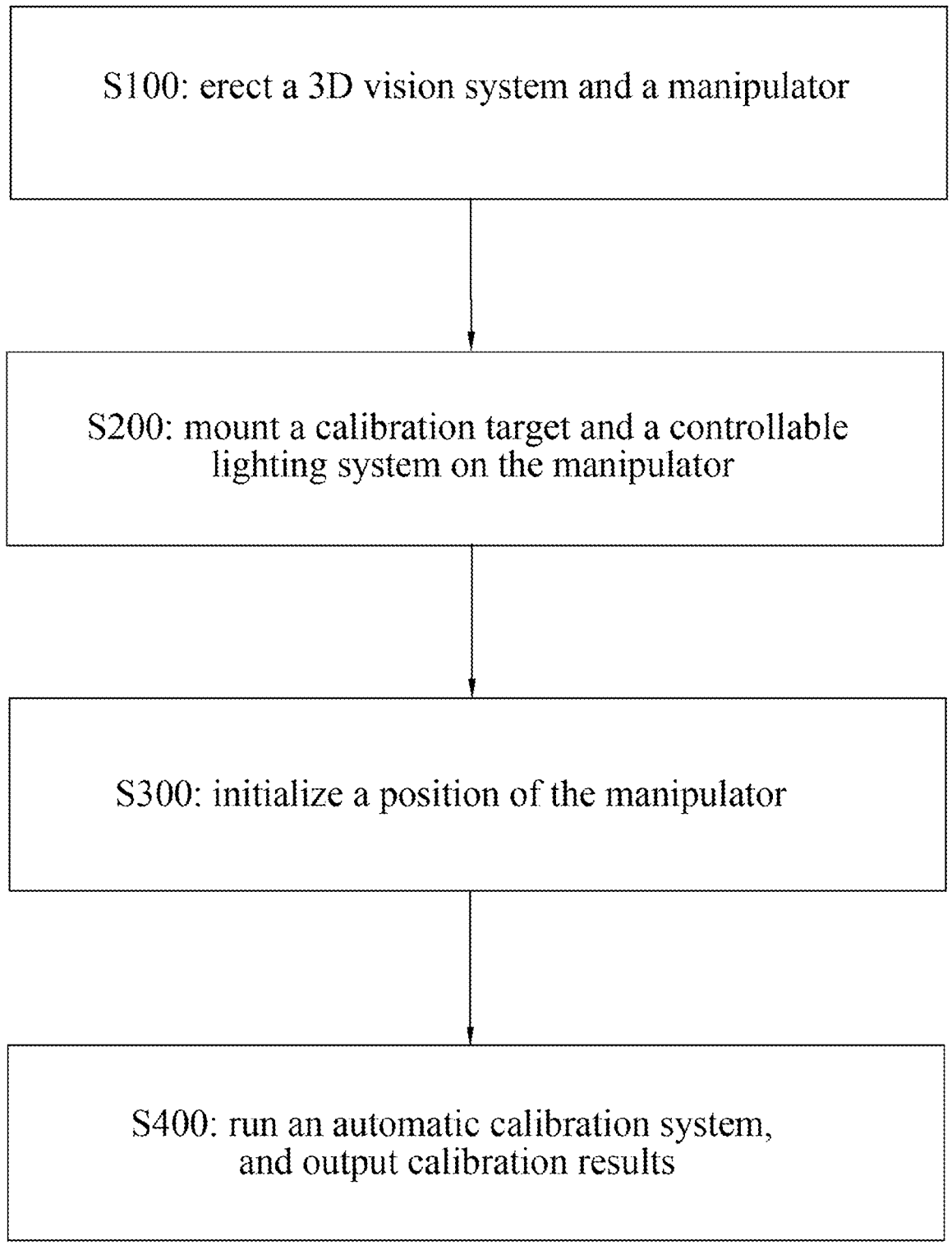
FIG. 1 is a brief flow chart of a full-automatic calibration method oriented to a structured light 3D vision system in a first embodiment of the disclosure.

As shown in FIG. 1, a first embodiment of the disclosure provides a full-automatic calibration method oriented to a structured light 3D vision system, which includes the following steps of:

S100: erecting a 3D vision system and a manipulator;
S200: mounting a calibration target and a controllable lighting system on the manipulator;
S300: initializing a position of the manipulator; and
S400: running an automatic calibration system, and outputting calibration results.

It should be pointed out that for an erected 3D vision system, full-automatic calibration can be completed without moving the 3D vision system; and for an unfixed 3D vision system, full-automatic calibration can be completed without manual operation. In the above two cases, the 3D vision system should be erected to be fixed first, and then the manipulator drives the calibration target to operate according to steps set by the automatic calibration system.

Figure 2:
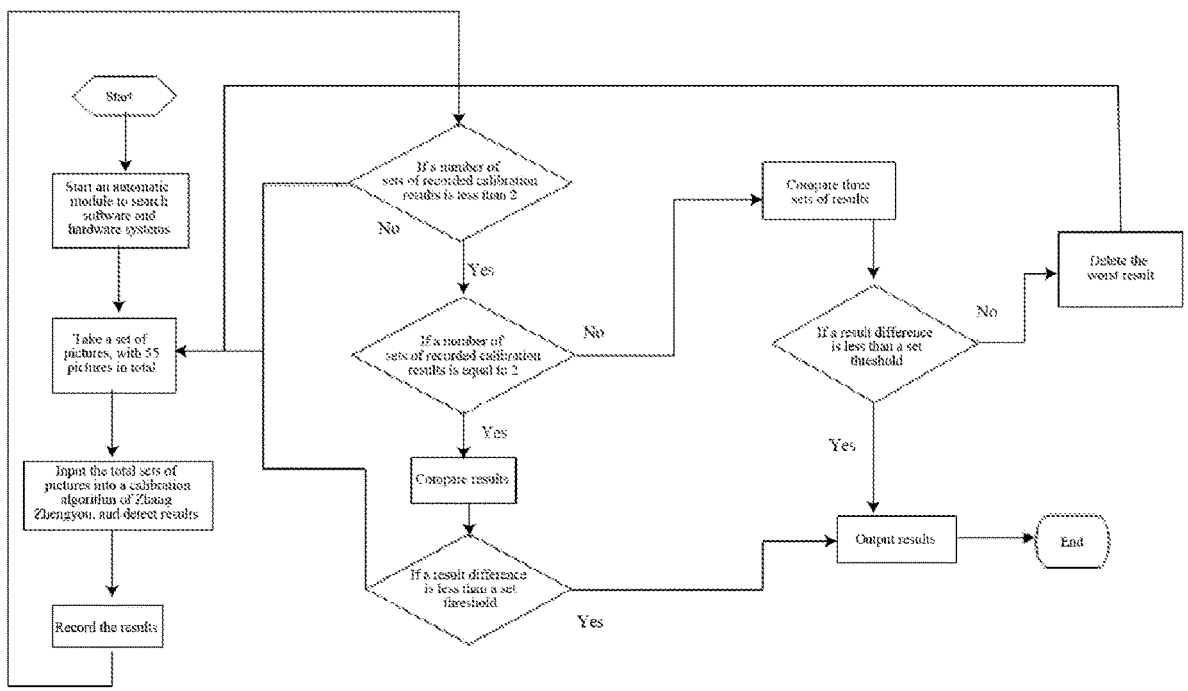
FIG. 2 is a flow chart of running an automatic calibration system in the full-automatic calibration method oriented to the structured light 3D vision system in the first embodiment of the disclosure.

As shown in FIG. 2, in step S400, the running an automatic calibration system specifically includes the following steps of:

1) taking 20 sets of pictures, with 45 pictures in each set, and storing the pictures into a folder with a specified path;
2) inputting the 20 sets of pictures into a calibration algorithm of Zhang Zhengyou, and detecting results;
3) adding one set of recorded results;
4) if a number of sets of "recorded results" is less than 2, returning to step 1); otherwise, going to step 5);
5) if the number of sets of "recorded results" is equal to 2, going to step 6);
6) if a result difference is less than a set threshold, going to step 7); otherwise, returning to step 1); and
7) averaging, and outputting results.

Figure 3:
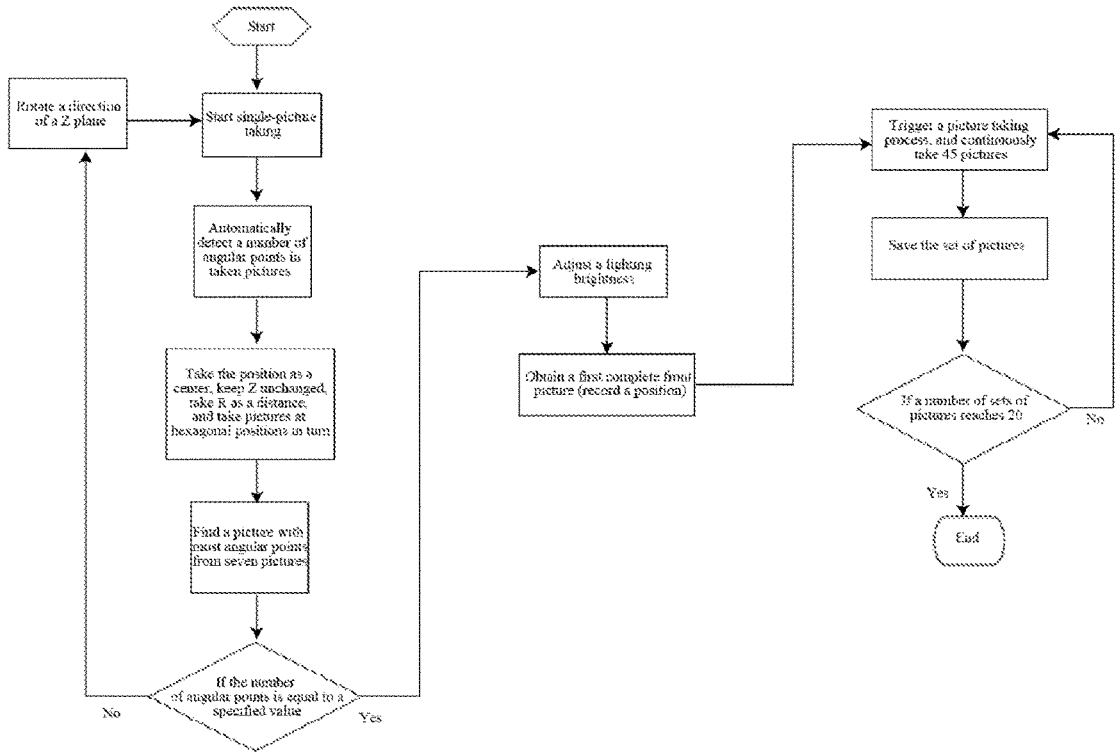
FIG. 3 is a flow chart of taking pictures in the full-automatic calibration method oriented to the structured light 3D vision system in the first embodiment of the disclosure.

As shown in FIG. 3, the taking 20 sets of pictures specifically includes the following steps of:

1) starting single-picture taking;
2) if a picture is obtained, continuing next step; and if no picture is obtained, searching for a picture;
3) performing hexagonal shift in a Z plane, taking a picture at each position, and judging a number of angular points and sorting the angular points;
4) if no picture is obtained, expanding a search range;
5) if no picture is obtained yet, returning to an original point, adjusting a direction of the Z plane by 45 degrees, and repeating the operations;
6) if a position of a largest angular point is found, adjusting a direction and a brightness of an illuminating camera in the 3D vision system to obtain a first complete front picture, and recording the position;
7) adjusting an angle to obtain a set of pictures;

8) adjusting a distance to obtain a set of pictures; and 9) obtaining 20 sets of pictures in total, with 50 pictures in each set.

In the whole process of taking the pictures, the 3D vision system sends patterns when the camera captures the pictures. One set of 45 pictures should be captured each time, and the 45 pictures are stored in the folder with the specified path. The calibration is performed once after taking 15 to 20 sets of pictures, and the calibration should be performed twice or three times in total.

In addition, non-professionals can perform the calibration by executing the following steps of:

step 1: rotating the calibration target in a small range;
step 2: searching for a front plane;
step 3: changing far and near;
step 4: rotating;
step 5: trying to calibrate;
step 6: circulating; and
step 7: outputting a calibration file.

Through the above steps, non-professionals can also obtain high-quality calibration results quickly.

To sum up, compared with the prior art, the full-automatic calibration method oriented to the structured light 3D vision system has the advantages as follows: for the erected 3D vision system, full-automatic calibration can be completed without moving the 3D vision system; and for an unfixed 3D vision system, full-automatic calibration can be completed without manual operation. By using the calibration method, on one hand, non-professionals can easily complete calibration of structured light 3D imaging; and on the other hand, a problem of calibrating a large number of 3D cameras can also be solved.

Figure 4:
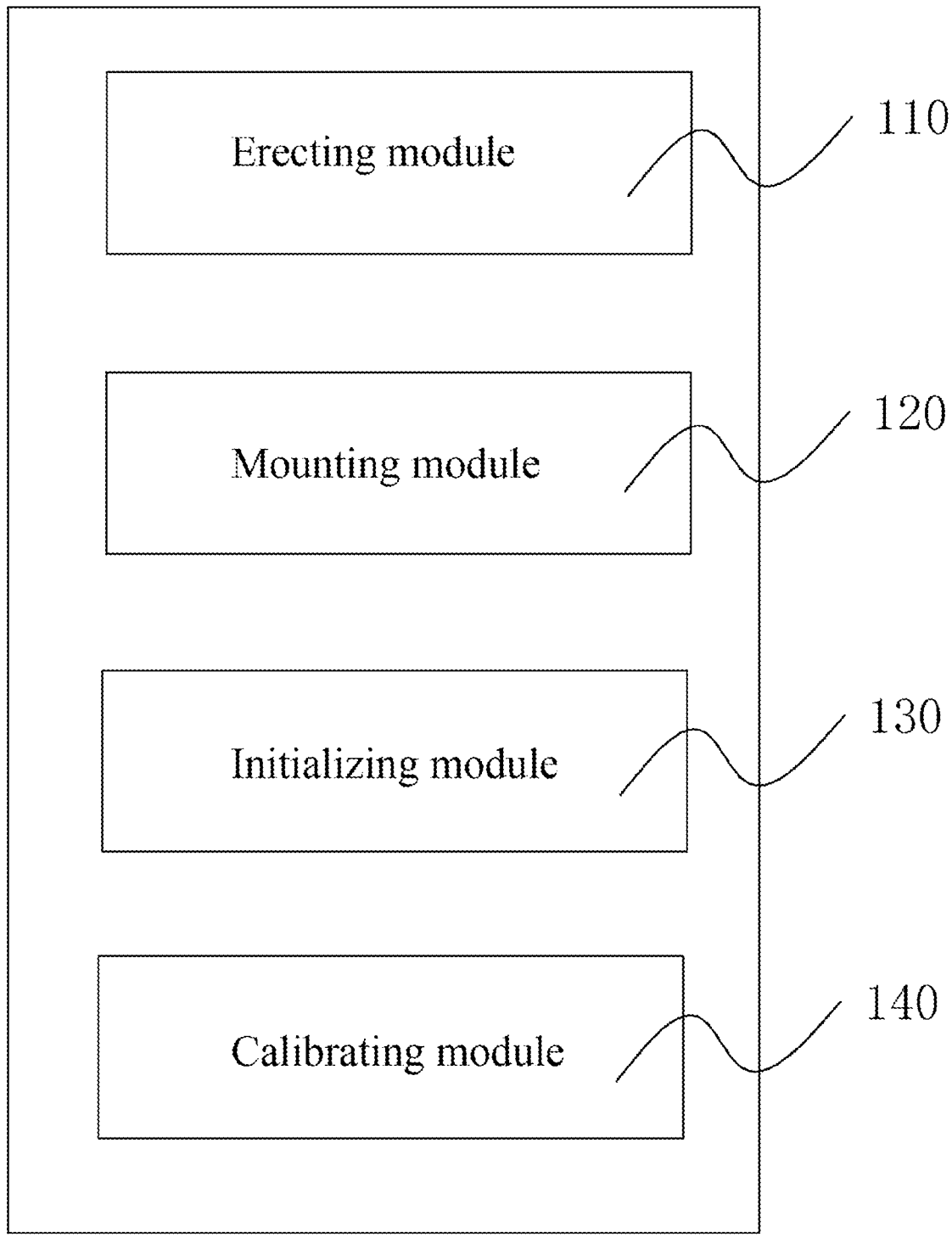
FIG. 4 is a brief structural diagram of a full-automatic calibration apparatus oriented to a structured light 3D vision system in a second embodiment of the disclosure.

In addition, as shown in FIG. 4, a second embodiment of the disclosure provides a full-automatic calibration apparatus oriented to a structured light 3D vision system, which includes:

an erecting module 110, configured for erecting a 3D vision system and a manipulator;

a mounting module 120, configured for mounting a calibration target and a controllable lighting system on the manipulator;

an initializing module 130, configured for initializing a position of the manipulator; and a calibrating module 140, configured for running an automatic calibration system, and outputting calibration results.

The full-automatic calibration apparatus oriented to the structured light 3D vision system in the embodiment is based on the same inventive concept as the full-automatic calibration method oriented to the structured light 3D vision system in the first embodiment. Therefore, the full-automatic calibration system oriented to the structured light 3D vision system in the embodiment has the same beneficial effects as follows: for the erected 3D vision system, full-automatic calibration can be completed without moving the 3D vision system; and for the unfixed 3D vision system, full-automatic calibration can be completed without manual operation. By using the apparatus, on one hand, non-professionals can easily complete calibration of structured light 3D imaging; and on the other hand, a problem of calibrating a large number of 3D cameras can also be solved.

Figure 5:
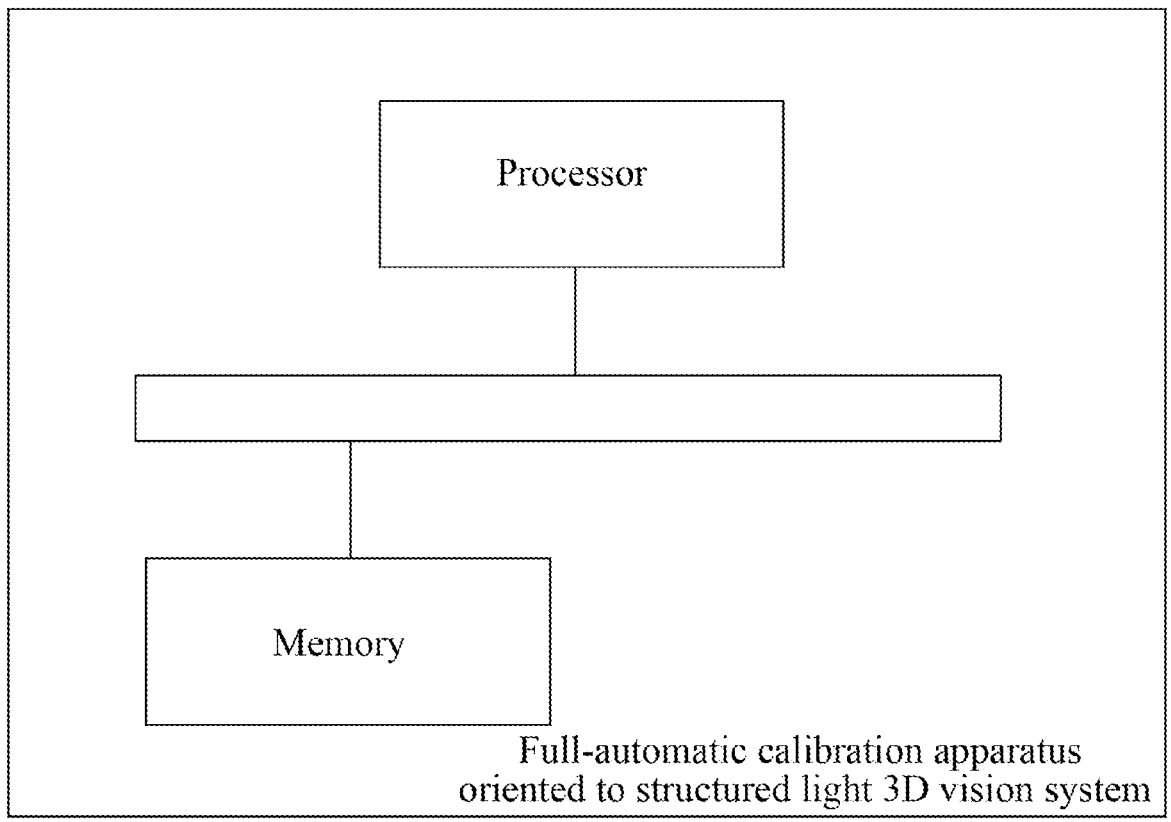
FIG. 5 is a brief structural diagram of a full-automatic calibration device oriented to a structured light 3D vision system in a third embodiment of the disclosure.

As shown in FIG. 5, a third embodiment of the disclosure provides a full-automatic calibration device oriented to a structured light 3D vision system, which includes:

at least one processor; and a memory in communication with the at least one processor;

wherein, the memory is configured to store an instruction executable by the at least one processor, and the instruction, when executed by the at least one processor, causes the at least one processor to perform the full-automatic calibration method oriented to the structured light 3D vision system in the first embodiment above.

The memory, as a non-transient computer-readable storage medium, may be configured for storing a non-transient software program, a non-transient computer-executable program and a module, such as a program instruction/module corresponding to a virtual image control method in the embodiment of the disclosure. The processor executes various functional applications and data processing of a stereoscopic imaging processing apparatus by operating the non-transient software program, instruction and module stored in the memory, that is, to implement the full-automatic calibration method oriented to the structured light 3D vision system in any one of method embodiments above.

The memory may include a program storage area and a data storage area, wherein the program storage area may store an operating system, an application program required by at least one function, and the data storage area may store data created according to use of the stereoscopic imaging processing apparatus. In addition, the memory may include a high-speed random access memory, and may further include a non-transient memory, such as at least one disk memory device, flash memory device, or other non-transient solid-state memory devices. In some embodiments, the memory optionally includes memories remotely arranged relative to the processor, and these remote memories may be connected to the stereoscopic projection apparatus through a network. Examples of the above network include but are not limited to the Internet, the Intranet, the local area network, the mobile communication network and a combination thereof.

The one or more modules are stored in the memory, and when executed by the one or more processors, the full-automatic calibration method oriented to the structured light 3D vision system in any method embodiment above is executed, such as executing the method steps S100 to S400 in the first embodiment.

A fourth embodiment of the disclosure further provides a computer-readable storage medium. The computer-readable storage medium stores a computer-executable instruction, and the computer-executable instruction is executed by one or more control processors, so that the above one or more processors may execute the full-automatic calibration method oriented to the structured light 3D vision system in the method embodiment above, such as executing the method steps S100 to S400 in the first embodiment.

The device embodiment described above is only illustrative, wherein the units described as separate components may or may not be physically separated, which means that the units may be located in one place or distributed across multiple network units. Some or all of the modules may be selected according to actual needs to achieve the objectives of the solutions in the embodiments.

From the description of the above embodiments, those of ordinary skills in the art may clearly understand that each embodiment may be implemented by means of software plus a general hardware platform, or by means of hardware. Those of ordinary skills in the art may understand that all or partial flows in the method of the above embodiments may be implemented by instructing related hardware through a computer program, and the program may be stored in a computer-readable storage medium. The program may implement the flows of the above method embodiments when executed. The storage medium may be a magnetic disk, an optical disk, a Read-Only Memory (ROM) or a Random Access Memory (RAM).

The foregoing describes the preferred embodiments of the disclosure in detail, but the disclosure is not limited to the above embodiments. Those of ordinary skills in the art may further make various equivalent modifications or substitutions without violating the gist of the disclosure, and these equivalent modifications or substitutions are included in the scope defined by the claims of the present application.

What is claimed is:

1. A full-automatic calibration method oriented to a structured light 3D (three-dimension) vision system, comprising:
erecting a 3D vision system and a manipulator;
mounting a calibration target and a controllable lighting system on the manipulator;
initializing a position of the manipulator; and
running an automatic calibration system, and outputting calibration results;
wherein the running an automatic calibration system comprises the following steps of:
1) taking 20 sets of pictures, with 45 pictures in each set;
2) inputting the 20 sets of pictures into a calibration algorithm of Zhang Zhengyou, and detecting results;
3) adding one set of recorded results;
4) if a number of sets of recorded results is less than 2, returning to step 1; otherwise, going to step 5;
5) if the number of sets of recorded results is equal to 2, going to step 6;
6) if a result difference is less than a set threshold, going to step 7; otherwise, returning to step 1, wherein the result difference is an amount of calibration accuracy improvement after each cycle of steps 1-5; and
7) averaging, and outputting results;
wherein the taking 20 sets of pictures comprises the following steps of:
1) starting single-picture taking;
2) if a picture is obtained, continuing next step; and if no picture is obtained, searching for a picture;
3) performing hexagonal shift in a Z plane, taking a picture at each position, and judging a number of angular points and sorting the angular points;
4) if no picture is obtained, expanding a search range;
5) if no picture is obtained yet, returning to an original point, adjusting a direction of the Z plane by 45 degrees, and repeating operations;
6) if a position of a largest angular point is found, adjusting a direction and a brightness of the 3D vision system to obtain a first complete front picture, and recording the position;
7) adjusting an angle to obtain a set of pictures;
8) adjusting a distance to obtain a set of pictures; and
9) obtaining 20 sets of pictures in total, with 50 pictures in each set.

2. The full-automatic calibration method oriented to a structured light 3D vision system of claim 1, wherein the running an automatic calibration system is performed for calibration for twice or three times.

3. A full-automatic calibration device oriented to a structured light 3D (three-dimension) vision system, comprising:
at least one processor; and
a memory in communication with the at least one processor; wherein,
the memory is configured to store an instruction executable by the at least one processor, and the instruction, when executed by the at least one processor, causes the at least one processor to perform a full-automatic calibration method comprising the following steps of:
erecting a 3D vision system and a manipulator;
mounting a calibration target and a controllable lighting system on the manipulator;
initializing a position of the manipulator; and
running an automatic calibration system, and outputting calibration results;
wherein the running an automatic calibration system comprises the following steps of:
1) taking 20 sets of pictures, with 45 pictures in each set;
2) inputting the 20 sets of pictures into a calibration algorithm of Zhang Zhengyou, and detecting results;
3) adding one set of recorded results;
4) if a number of sets of recorded results is less than 2, returning to step 1; otherwise, going to step 5;
5) if the number of sets of recorded results is equal to 2, going to step 6;
6) if a result difference is less than a set threshold, going to step 7; otherwise, returning to step 1, wherein the result difference is an amount of calibration accuracy improvement after each cycle of steps 1-5; and
7) averaging, and outputting results;
wherein the taking 20 sets of pictures comprises the following steps of:
1) starting single-picture taking;
2) if a picture is obtained, continuing next step; and if no picture is obtained, searching for a picture;
3) performing hexagonal shift in a Z plane, taking a picture at each position, and judging a number of angular points and sorting the angular points;
4) if no picture is obtained, expanding a search range;
5) if no picture is obtained yet, returning to an original point, adjusting a direction of the Z plane by 45 degrees, and repeating operations;
6) if a position of a largest angular point is found, adjusting a direction and a brightness of the 3D vision system to obtain a first complete front picture, and recording the position;
7) Adjusting an angle to obtain a set of pictures;
8) adjusting a distance to obtain a set of pictures; and
9) obtaining 20 sets of pictures in total, with 50 pictures in each set.

4. A non-transitory computer-readable storage medium, wherein the computer-readable storage medium stores a computer-executable instruction, and the computer-executable instruction is configured for enabling a computer to perform a full-automatic calibration method comprising:
erecting a 3D (three-dimension) vision system and a manipulator;
mounting a calibration target and a controllable lighting system on the manipulator;

initializing a position of the manipulator; and running an automatic calibration system, and outputting calibration results;

wherein the running an automatic calibration system comprises the following steps of:

1) taking 20 sets of pictures, with 45 pictures in each set;

2) inputting the 20 sets of pictures into a calibration algorithm of Zhang Zhengyou, and detecting results;

3) adding one set of recorded results;

4) if a number of sets of recorded results is less than 2, returning to step 1; otherwise, going to step 5;

5) if the number of sets of recorded results is equal to 2, going to step 6;

6) if a result difference is less than a set threshold, going to step 7; otherwise, returning to step 1, wherein the result difference is an amount of calibration accuracy improvement after each cycle of steps 1-5; and 7) averaging, and outputting results;

wherein the taking 20 sets of pictures comprises the following steps of:

1) starting single-picture taking;

2) if a picture is obtained, continuing next step; and if no picture is obtained, searching for a picture;

3) performing hexagonal shift in a Z plane, taking a picture at each position, and judging a number of angular points and sorting the angular points;

4) if no picture is obtained, expanding a search range;

5) if no picture is obtained yet, returning to an original point, adjusting a direction of the Z plane by 45 degrees, and repeating operations;

6) if a position of a largest angular point is found, adjusting a direction and a brightness of the 3D vision system to obtain a first complete front picture, and recording the position;

7) adjusting an angle to obtain a set of pictures;

8) adjusting a distance to obtain a set of pictures; and 9) obtaining 20 sets of pictures in total, with 50 pictures in each set.

5. The full-automatic calibration device oriented to a structured light 3D vision system of claim 3, wherein the running an automatic calibration system is performed for calibration for twice or three times.

6. The non-transitory computer-readable storage medium of claim 4, wherein the running an automatic calibration system is performed for calibration for twice or three times.

* * * * *